United States Patent
Nurminen et al.

(10) Patent No.: US 11,733,391 B2
(45) Date of Patent: Aug. 22, 2023

(54) ENTRANCE DETECTION BASED ON GNSS STATE CHANGE DATA

(71) Applicant: HERE GLOBAL B.V., Eindhoven (NL)

(72) Inventors: Henri Jaakko Julius Nurminen, Tampere (FI); Petri Rauhala, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 71 days.

(21) Appl. No.: 17/557,657

(22) Filed: Dec. 21, 2021

(65) Prior Publication Data

US 2023/0194729 A1 Jun. 22, 2023

(51) Int. Cl.
*G01S 19/24* (2010.01)
*G01S 19/39* (2010.01)

(52) U.S. Cl.
CPC ............ *G01S 19/24* (2013.01); *G01S 19/396* (2019.08)

(58) Field of Classification Search
CPC .............................. G01S 19/24; G01S 19/396
USPC ..................................................... 342/357.63
See application file for complete search history.

(56) References Cited

U.S. PATENT DOCUMENTS

| | | |
|---|---|---|
| 8,320,939 B1 | 11/2012 | Vincent |
| 8,751,151 B2 | 6/2014 | Funk et al. |
| 9,389,085 B2 | 6/2016 | Khorashadi et al. |
| 9,541,404 B2 | 1/2017 | Yang et al. |
| 2019/0249993 A1 | 8/2019 | Young et al. |
| 2021/0012660 A1 | 1/2021 | Chen et al. |

FOREIGN PATENT DOCUMENTS

| | | | | |
|---|---|---|---|---|
| CN | 109285376 A | * | 1/2019 | ......... G06K 9/00778 |
| EP | 2728310 A1 | * | 5/2014 | ............. G01C 21/26 |
| WO | WO-2011038976 A1 | * | 4/2011 | ............. G01S 19/22 |

OTHER PUBLICATIONS

Zhu, et al., "Fast Indoor/Outdoor Transition Detection Algorithm Based on Machine Learning," Sensors 2019, 19, 786; doi: 10.3390/s19040786; Published on Feb. 14, 2019 (pp. 1-23); https://www.mdpi.com/journal/sensors.
U.S. Appl. No. 16/419,128, filed May 22, 2019, Entitled: Method, Apparatus, and Computer Program Product for Identifying Building Accessors, Inventor(s): Ole Henry Dorum.

* cited by examiner

*Primary Examiner* — Harry K Liu
(74) *Attorney, Agent, or Firm* — Jeffrey R. Moisan; Here Global B.V.

(57) ABSTRACT

Disclosed is an approach for automatic detection of entrance(s). In particular, processor(s) could have access to counter data arranged to maintain counters that each respectively represent a count of how many times GNSS service has been obtained or lost in a respective one of a plurality of sub-areas. Given this, the processor(s) could detect a GNSS state change corresponding to an instance of GNSS service being obtained or lost in a particular sub-area and could responsively increment the respective counter associated with the particular sub-area. In turn, the processor(s) could make a determination that the respective counter is representing a count that is greater than other count(s) represented by counter(s) associated with other sub-area(s). And based at least on this determination, the processor(s) could deem the particular sub-area to include an entrance, thereby resulting in detection of the entrance.

20 Claims, 9 Drawing Sheets

ENTRANCE DETECTION BASED ON GNSS STATE CHANGE DATA

FIELD OF THE DISCLOSURE

Embodiments of the present disclosure relate to the field of positioning technologies, and more specifically to method(s) and system(s) for detecting location(s) of entrance(s) to building(s) and/or other Global Navigation Satellite System (GNSS)-denied areas.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure deployed in buildings and/or outdoors (e.g., Wi-Fi, Bluetooth, Base Station(s) etc.) as well as on existing capabilities in consumer devices, such as on radio technologies that are already supported in numerous consumer devices on the market, among other options.

One approach for such radio-based positioning could involve crowdsourced collection of radio "fingerprint(s)" from mobile devices, which may then be used for generating or updating radio map(s). A given fingerprint may include radio data representing measurements of radio signals respectively observed by the mobile devices, which may include received signal strength value(s), round-trip time value(s) and/or respective identifiers of radio node(s) emitting those signal(s) etc. Additionally, a given fingerprint may include a position estimate determined or obtained by the mobile device, which may be used for geo-referencing the radio data in the fingerprint so as to indicate a location where the radio data was collected. Such a position estimate may be, for example, based on Global Navigation Satellite System (GNSS) data, sensor data, and/or may be manually inputted via a user interface, among other options.

Once a radio map is generated or updated based on collected fingerprint(s), the radio map may effectively model a radio environment in an indoor and/or outdoor area. In practice, this could enable an entity (e.g., a server or a mobile device) to determine characteristics of radio signals that are expected to be observable respectively at different locations in the area. Given this, the entity could compare further (e.g., radio) measurements from a device to the radio map, to estimate a position of that device in the area.

Generally, radio-based positioning could be used alone or in combination with other positioning technologies, such as GNSS, so as to enable a user's navigation through and between indoor and/or outdoor environments. In this process, e.g., a navigation application could leverage such positioning technologies so as to guide the user to an optimal entrance (or corresponding exit) when there is a need for an outdoor-to-indoor transition or vice versa. Thus, precise (e.g., building) entrance location(s) may be a useful map feature e.g., for navigation and/or other purposes.

Given this, there is a need for technical solutions to detect location(s) of entrance(s), so that such detected entrances can be incorporated as map feature(s) (referred to hereinafter as mapping of entrances or the like.) Although some techniques for mapping/detection of entrances have been developed, the existing solutions have various deficiencies.

By way of example, one existing technique may involve mapping of entrances based on architectural models. In this technique, entrance locations may be contained e.g., in (Computer-Aided Design) CAD drawings or other architectural models of buildings. So, when a map (e.g., indoor map) is generated based on an architectural model, the map will include these entrance locations. At issue, however, is that such a technique may include some manual steps and may require user involvement, including e.g., the need to get access to architectural models possessed by building owners or other individuals. Therefore, this technique may not be scalable and/or may not allow for easily gathering and maintaining up-to-date information about entrance locations.

Another existing technique may involve indoor mapping of entrances based on data from visual sensor(s). For instance, entrance(s) can be detected using visual sensor image(s) (e.g., from camera(s) and/or Light Detection and Ranging (LiDAR) device(s)), where such image(s) can be captured by individual(s) moving around an indoor space to which the entrance(s) lead. Although this technique could be implemented with automatic capture of such images, more often this technique may require individuals to actively navigate to the entrance(s) and manually capture the image(s) of those entrance(s) so as to enable their detection. Therefore, this technique may also not be scalable, as it may require user involvement and manual steps.

Yet another existing technique may involve outdoor mapping of entrances based on data from visual sensor(s). For instance, entrances can be detected using visual sensor image(s), such as e.g., from camera(s) and/or LiDAR device(s) found on vehicle(s). Although this technique may require a manual collection campaign, it may nonetheless be more scalable compared to the previously-described existing techniques due to the number of vehicles that can be involved and found around various environments. Yet, even this technique has deficiencies as it likely cannot cover all cases for entrance detection. For instance, entrances that are far from any road and/or are in an inner yard of a building may not be detected using this technique. Additionally or alternatively, smaller cities, towns, and/or suburban areas may not have enough vehicle(s) for a manual collection campaign or otherwise may not be included in such collection campaigns.

At issue then is how to enable automatic learning of entrance location(s) in an accurate and scalable manner, so as to ensure seamless and optimized navigation, among other use cases.

SUMMARY

Disclosed is an improved approach for automatic learning of entrance location(s). The disclosed approach may rely on collection of GNSS-related information that may indicate where and to what extent GNSS service is being obtained and/or lost i.e., to what extent GNSS state changes are occurring respectively in various sub-area(s). In this regard, there may be multiple reasons as to why GNSS service is obtained or lost. For example, GNSS state may change when a user starts or stops using GNSS, or it may change due to a user entering or exiting a building or other GNSS-denied area. Although it may not always be possible to determine the exact reason for a given GNSS state change, the disclosed approach stems from a unique and novel recognition that an exceptionally high extent of GNSS state changes in a given sub-area is more likely to be due to user(s) entering and/or exiting a GNSS-denied area (e.g., building), and thus such an assumption can be leveraged for automatic learning of entrance location(s).

More specifically, the disclosed approach may involve dividing a collection area (e.g., the world or an urban area) into a plurality of sub-areas and maintaining counters respectively for these sub-areas. Each such counter may track the number of GNSS state changes that have been detected in a respective sub-area based on crowdsourced GNSS-related information gathered from one or more devices that are or were located in one or more of those sub area(s). So, when a given GNSS state change is detected, processor(s) (e.g., of positioning server(s)) could increment a counter associated with the sub-area in which the GNSS state change occurred.

In this arrangement, the processor(s) could make a determination that a particular sub-area has significantly more GNSS state change detections compared to other sub-area(s) in the vicinity and could responsively deem the particular sub-area as likely containing an entrance to a GNSS-denied area. In doing so, the processor(s) could generate or update a map to accurately represent the location of the detected entrance, so that such a mapped entrance can in turn be leveraged for e.g., navigation purposes, among various other options.

Overall, embodiments of the disclosed approach may provide for various technical advantages. For example, because the disclosed approach leverages GNSS technology that may be used anywhere in the world, the disclosed approach may be very scalable as it could enable learning of entrances in various areas around the world. Additionally, the disclosed approach could be automated and performed without much or any user involvement, as it can leverage an automated process for crowdsourcing GNSS-related information. Further, the disclosed approach may allow for maintaining up-to-date information about entrance(s), including automatic detection of newly-constructed entrance(s) in building(s) and/or detection of entrance(s) in newly-constructed building(s). And, moreover, the disclosed approaches could even be used to successfully detect entrances that are not visible from any street, thereby overcoming deficiencies of existing techniques. Numerous other advantages are possible as well.

Accordingly, in one aspect, disclosed is a method. The method involves: receiving, by one or more processors, GNSS-related information, where the one or more processors have access to counter data arranged to maintain a plurality of counters that each respectively represent a count of how many times GNSS service has been obtained or lost in a respective one of a plurality of sub-areas; based on the received GNSS-related information, detecting, by the one or more processors, a GNSS state change corresponding to an instance of GNSS service being obtained or lost in a particular sub-area of the plurality of sub-areas; in response to detecting the GNSS state change in the particular sub-area, incrementing, by the one or more processors, the respective counter associated with the particular sub-area; making a determination, by the one or more processors, that (i) the respective counter associated with the particular sub-area is representing a particular count that is greater than (ii) one or more other counts represented by one or more respective counters associated with one or more other sub-areas of the plurality of sub-areas; and based at least on the determination, deeming, by the one or more processors, the particular sub-area to include an entrance, thereby resulting in detection of the entrance.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method(s), among others.

In yet another aspect, disclosed is a non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s). In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
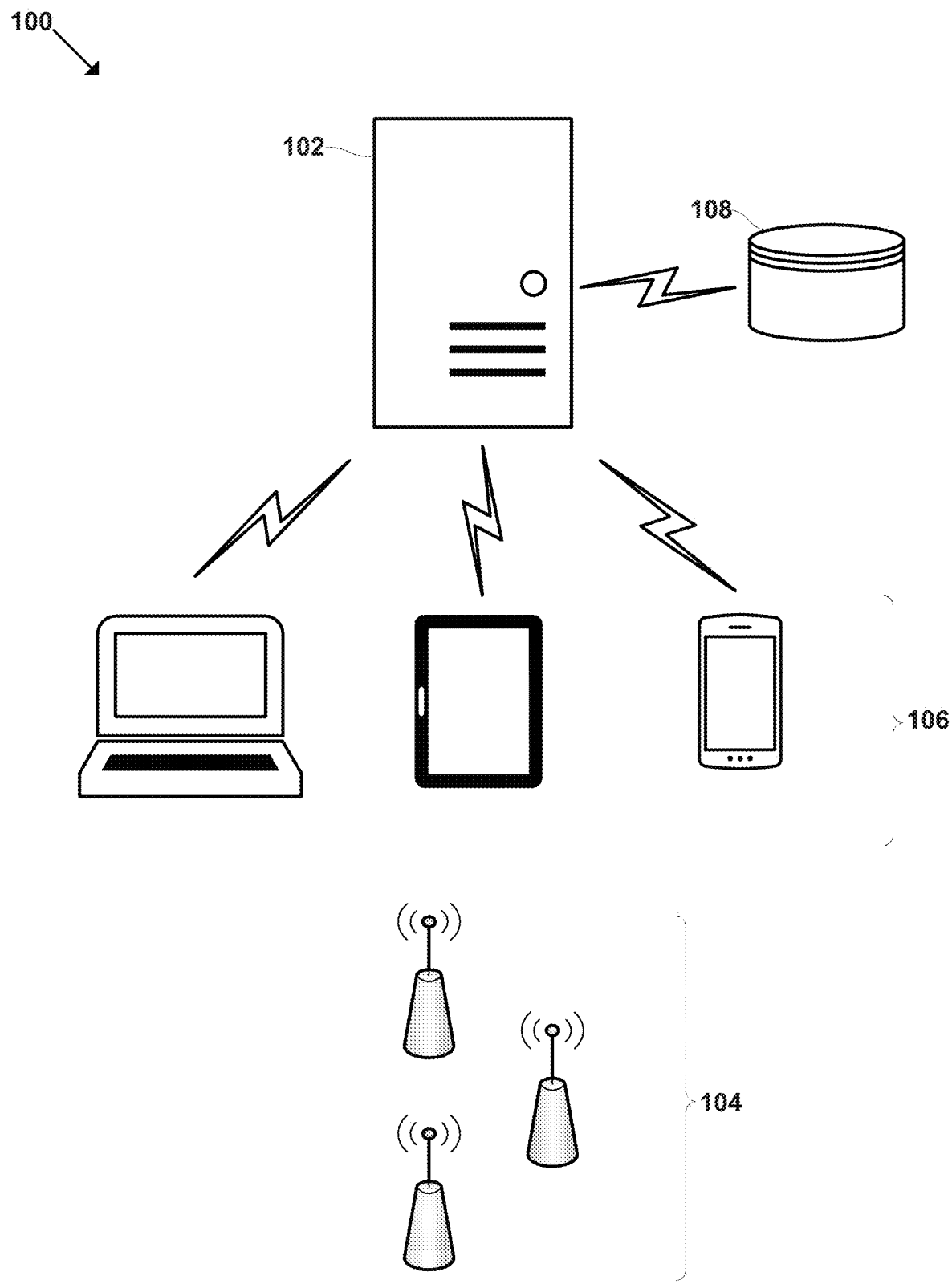
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example System(s) for Indoor and/or Outdoor Positioning

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102 (could also be referred to as server(s) or the like), radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options. In some cases, a mobile device could also be referred to as a handheld device or a user device, among other possibilities.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
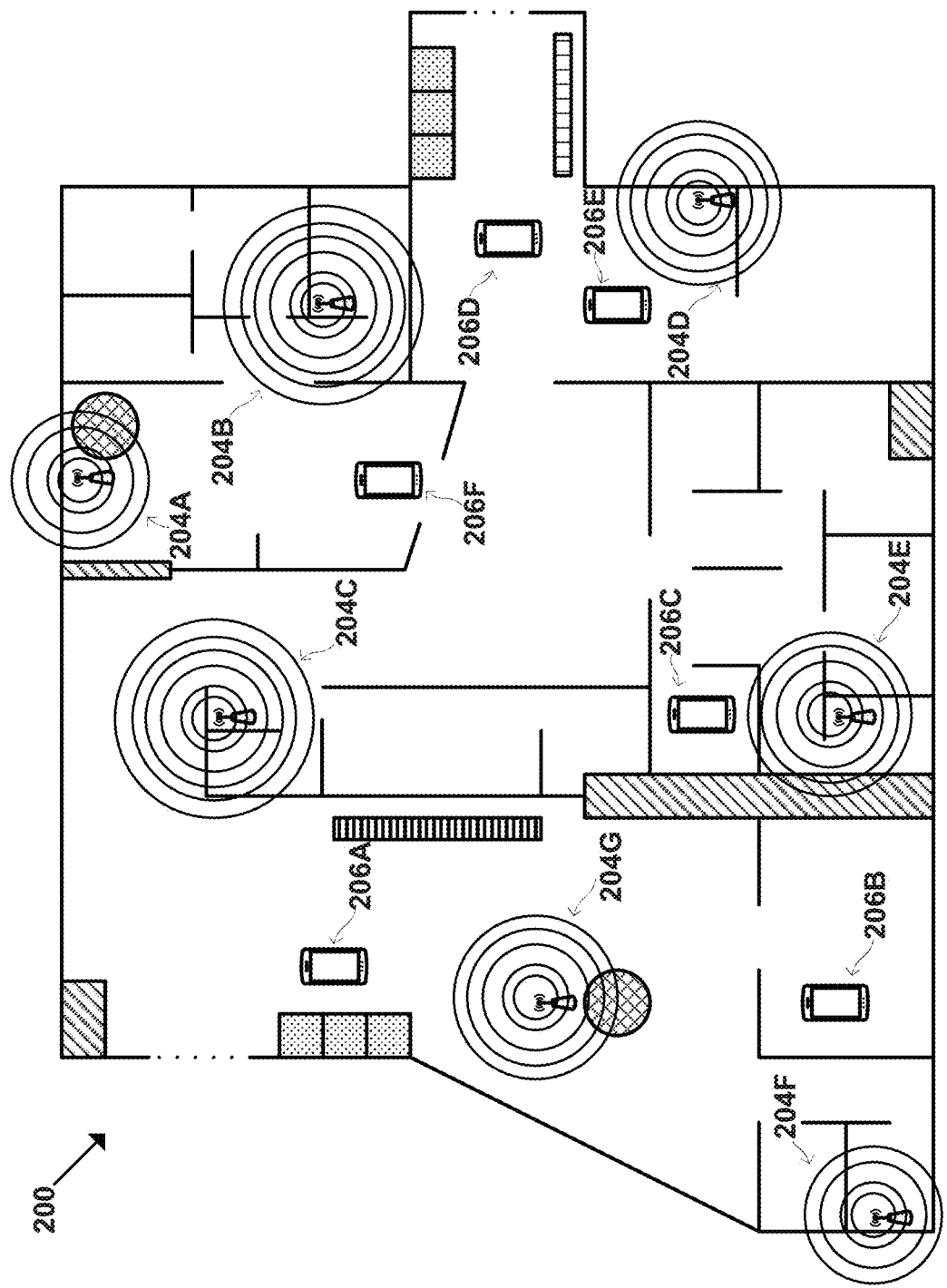
FIGS. 2A and 2B illustrate an indoor area at which radio device(s) and mobile device(s) can be located, in accordance with an example implementation.
Figure 2B:
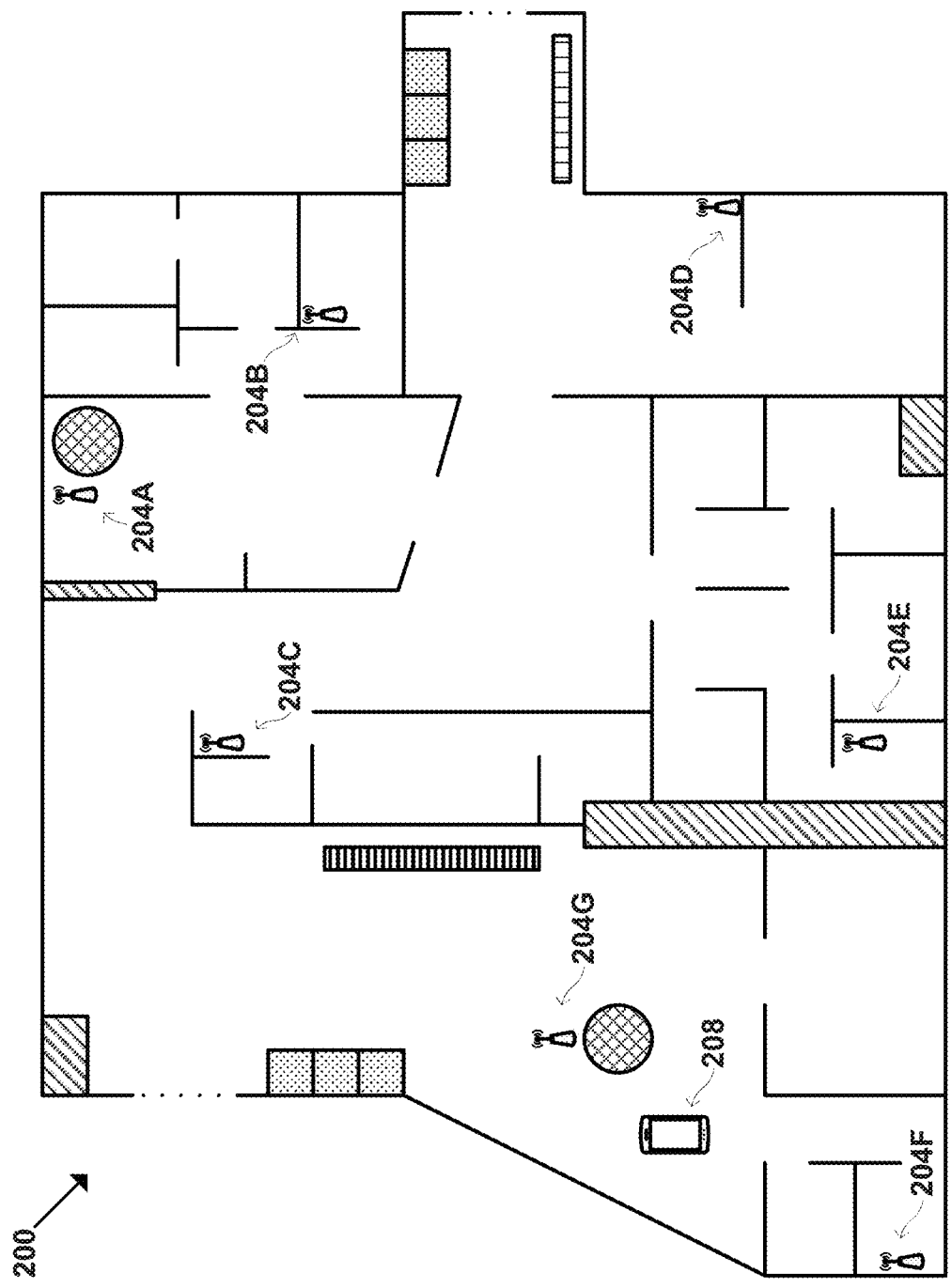
Figure 2C:
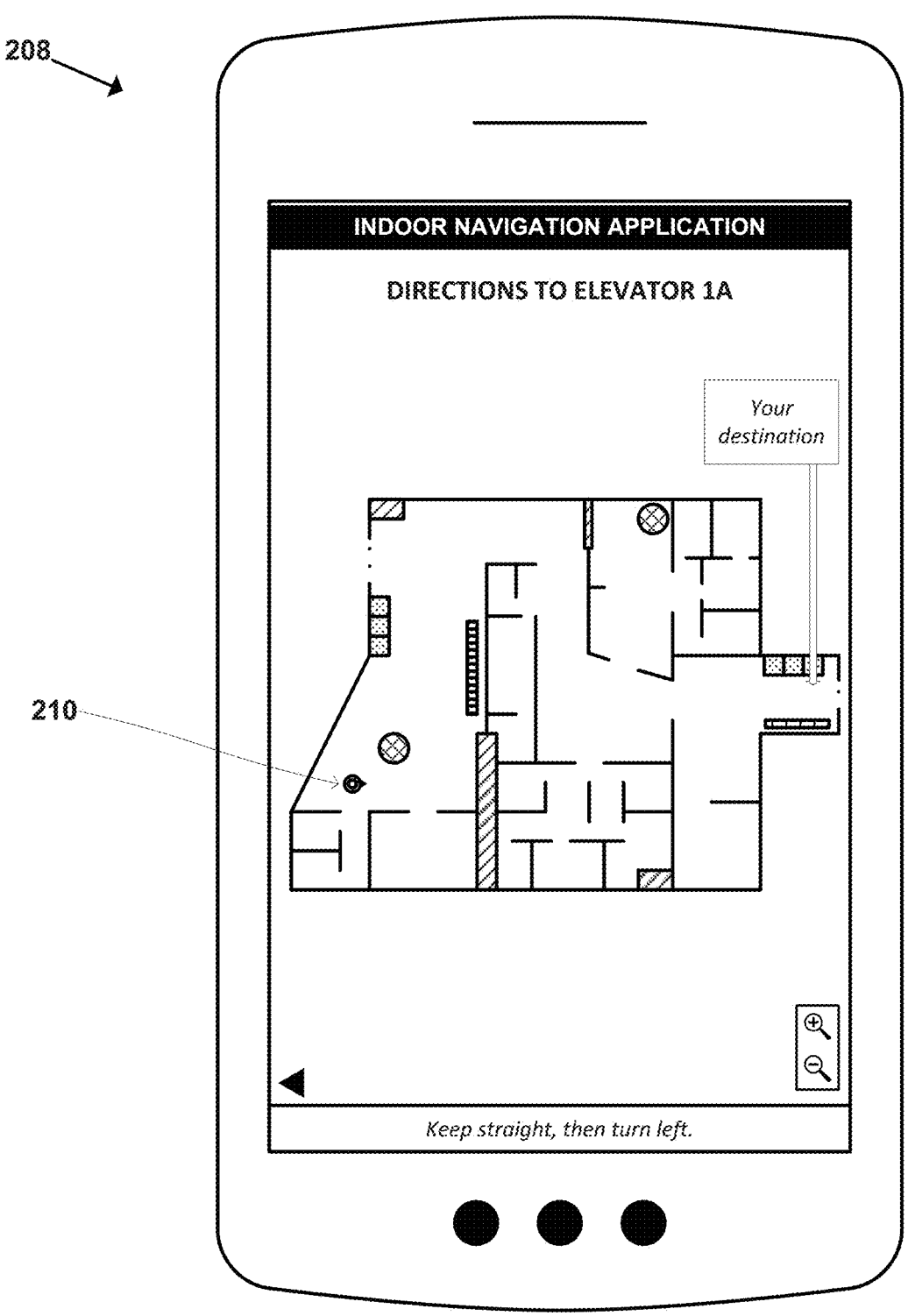
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Example Method(s) for Entrance Detection

As noted above, the present disclosure is directed to an improved approach for (e.g., building) entrance detection. In particular, the disclosed approach leverages an assumption that a locally exceptionally high extent of GNSS service being obtained and/or lost in a given sub-area may serve as an indication that an entrance is located in that given sub-area. Thus, the disclosed approach may help enable automated learning and mapping of entrance locations, which is useful for e.g., navigation and/or other purposes.

Generally speaking, the disclosed approach could be described in the context of detecting entrance(s) to building(s). However, it should be understood that the disclosed approach may apply to any type of entrance, such a tunnel entrance, entrance to a parking garage, or entrance to any other GNSS-denied area (e.g., an area where no or lesser extent of GNSS signals may be observed.) Moreover, it should be understood that the disclosed approach may apply or could otherwise be described in the context of exit detection, where any given exit from a GNSS-denied area might also be a corresponding entrance to that GNSS-denied area.

Figure 3:
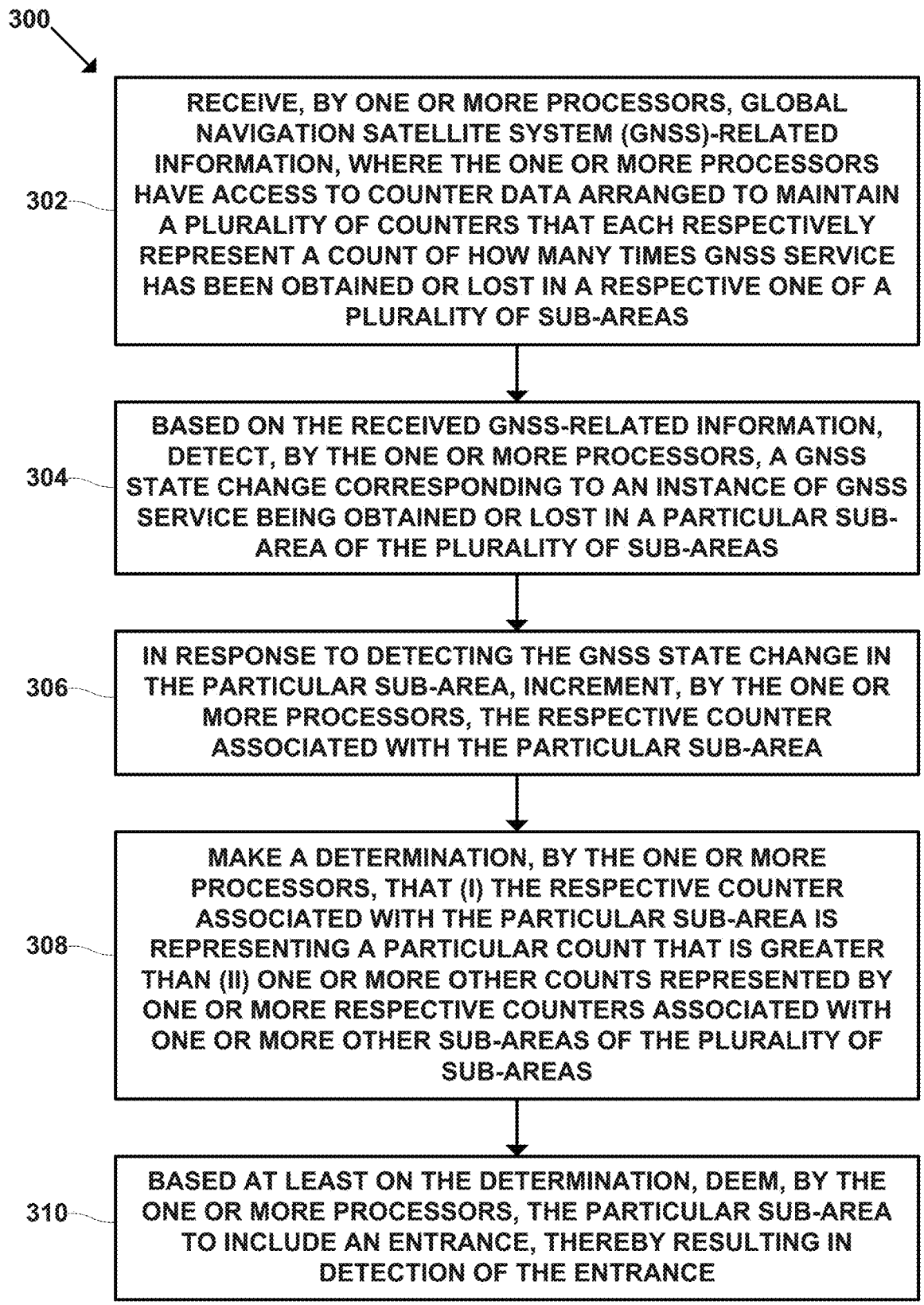
FIG. 3 is an example flowchart representing an approach for entrance detection, in accordance with an example implementation.

FIG. 3 is next a flowchart illustrating method 300 in accordance with the present disclosure. Such method(s) could be performed by and/or in an arrangement involving mobile device(s), server device(s), and/or any other device or system. Also, it should be understood that, if a given method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, operation(s) described herein could be distributed among entities, such as in accordance with a client-server arrangement or the like.

In some implementations, method 300 could be performed by and/or in arrangement(s) (e.g., arrangement 100) involving a server (e.g., server system 102) and/or a device (e.g., mobile device 106) or more particularly by component(s)/module(s) (e.g., processor(s)) thereof, among other possibilities. Other implementations are also possible.

As shown in block 302, method 300 may involve receiving, by one or more processors, GNSS-related information, where the one or more processors have access to counter data arranged to maintain a plurality of counters that each respectively represent a count of how many times GNSS service has been obtained or lost in a respective one of a plurality of sub-areas.

As an initial matter, a given instance of GNSS service being obtained or lost (e.g., at a given device) could be referred to herein as a GNSS state change. In practice, various event(s) may constitute or otherwise correspond to a GNSS state change, such as e.g., a given device obtaining GNSS service after having no such GNSS service, a given device completely losing GNSS service after having such GNSS service, ability or inability to obtain a GNSS-based position or signal in response to a request for the GNSS-based position or signal, and/or signal strength of the GNSS-based signal changing by at least a threshold extent. Other examples are also possible.

Additionally, the counter data could be stored at a server device or another data storage device in communication with or otherwise accessible to the processor(s). The counter data may include a digital counter per respective sub-area so as to maintain a count of how many GNSS state changes have occurred in the respective sub-area. In practice, one or more of (or all of) the counters may maintain an overall count and may never expire, to enable tracking of the number of GNSS state changes over time. Additionally or alternatively, one or more of (or all of) the counters may respectively expire after a respective (e.g., pre-defined) duration, to e.g., enable tracking of the number of GNSS state changes over a certain (e.g., more recent) time period.

In either case, the plurality of sub-areas at issue could be arranged or otherwise configured in various ways. For example, a collection area (e.g., the world, an urban area, and/or any area(s) known to contain building(s)) can be programmatically divided into the plurality of sub-areas. In some implementations, the plurality of sub-areas could be defined e.g., by a grid (e.g., with 4-meter grid point spacing), such as a grid corresponding to map tiles of map data and/or the above-described grid associated with radio map data, among other possibilities. In other implementations, however, the plurality of the sub-areas could be of any feasible shape(s) and/or size(s) without departing from the scope of the present disclosure.

Moreover, the size of the sub-areas may directly correspond to location accuracy for detected entrance(s), with smaller sizes likely enabling a more accurate localization of entrance(s) and vice versa. Given this, the system could be configured such that a user of the disclosed approach could select (e.g., via a user interface) the size of the sub-areas in accordance with a desired entrance location accuracy and/or such that the system could automatically set the size of the sub-areas based on user selection of a desired entrance location accuracy, among other options.

In a system arranged as described, as noted, the processor(s) could receive GNSS-related information respectively from one or more devices located in one or more of the sub-areas at issue. In doing so, the processor(s) could receive GNSS-related information respectively from the device(s) over time, at the same time, and/or at different times, among other possibilities.

In practice, the process of receiving GNSS-related information could be arranged according to one or more of various implementations. For example, the processor(s) could crowdsource GNSS-related information from device(s) in accordance with a crowdsourcing process, which may involve the processor(s) requesting GNSS-related information from mobile device of a large number of consumers and/or the mobile device transmitting GNSS-related information to the processor(s) (e.g., continuously and/or from time-to time.) Here again, consumers may consent to participation in such a collection process, assuming their device is equipped with a GNSS receiver, naturally with end-user consent. Also, it could be possible to use volunteers to actively survey sub-area(s) so as to enable collection GNSS-related information for those area(s). Other arrangements are also possible.

In this regard, GNSS-related information could take on various forms without departing from the scope of the present disclosure.

For example, GNSS-related information could take the form of a (e.g., sufficiently precise) GNSS location indicating that GNSS service was available to a device or a message that a GNSS location could not be obtained, which may indicate that GNSS service was not available to the device. Given this, the device providing a GNSS location and subsequently (e.g., within a threshold time period or in a subsequent communication) providing a message that a GNSS location could not be obtained may serve as an indication to the processor(s) that GNSS service was lost, and vice versa. In such cases, the GNSS location at issue may substantially indicate the sub-area at which the device was located when GNSS service was obtained or lost. However, the device could use any other positioning technology (or perhaps a manual user indication of a location) to determine and provide its location, so that the provided location can be used for determining the sub-area at which the device was located.

In another example, GNSS-related information could include data representing GNSS signal strength (or signal strength changes) detected by a given device, among other GNSS data (e.g., about observed satellites etc.). So, e.g., the processor(s) detecting a significant reduction in the GNSS signal strength (e.g., a decrease in signal strength that exceeds a pre-defined signal strength value) may indicate that GNSS service was lost. And the processor(s) detecting a significant increase in the GNSS signal strength (e.g., an increase in signal strength that exceeds a pre-defined signal strength value) may indicate that GNSS service was obtained. In either case, the processor(s) could use the GNSS-related information to determine the device's approximate location, or the device could provide the location together the GNSS data. Here again, the GNSS location (or a location determined with another or manual input) may indicate the sub-area at which the device was located when GNSS service was obtained or lost.

In yet another example, GNSS-related information could include an indication that GNSS service was obtained or lost. For example, a given device could detect that its GNSS service was obtained or lost and could responsively transmit an indication to the processor(s) that the GNSS service was obtained or lost e.g., perhaps with a location of the device substantially at the time that the GNSS service was obtained or lost. Here again, the location at issue could be based on GNSS or any other positioning technology and could be used by the processor(s) to determine the sub-area at which the device was located. Other examples are also possible.

In some implementations, the GNSS-related information could be part of fingerprint(s) that device(s) provide to the processor(s), such as e.g., the above-described radio fingerprint(s). By way of example (and without limitation), a given fingerprint could include a GNSS location as a reference location (or message indicating that no GNSS location is available), GNSS signal strength data, and/or indication(s) of whether GNSS service was obtained or lost, among others. Such fingerprint(s) can respectively include other data as well, such as radio data, altitude data, and/or timestamp(s), among other options contemplated herein or otherwise apparent to those of ordinary skill in the art. Numerous other implementations are also possible.

As shown in block 304, method 300 may next involve, based on the received GNSS-related information, detecting, by the one or more processors, a GNSS state change corresponding to an instance of GNSS service being obtained or lost in a particular sub-area of the plurality of sub-areas. And as shown in block 306, method 300 may then involve responsively incrementing, by the one or more processors, the respective counter associated with the particular sub-area.

More specifically, when processor(s) detect that a given device lost or obtained GNSS service, the processor(s) may responsively increment the counter associated with the sub-area where the GNSS state change occurred. For example, a given sub-area X may have a counter having a current value of 11 (eleven). And when the processor(s) detect that the given device lost or obtained GNSS service in that sub-area X, the processor(s) may increment the counter's value from 11 to 12 (twelve). Then, if the processor(s) detect that the same or different device lost or obtained GNSS service in that sub-area X, the processor(s) may further increment the counter's value from 12 to 13 (thirteen), and so on.

In practice, the processor(s) may be configured to analyze instance(s) of detected GNSS state change(s) in one of various ways. For example, the processor(s) may increment a counter for a sub-area when a given device encounters a GNSS state change and may do so again even if the same device again encounters a GNSS state change in that same sub-area at a future time. However, if the given device encounters multiple GNSS state changes in the sub-area e.g., within a pre-defined duration of time and/or without having left the sub-area at issue, then the processor(s) could count just one GNSS state change or could count each such detected GNSS state change, depending on the desire implementation of the disclosed approach. Moreover, if multiple devices each respectively encounter a GNSS state change at substantially the same time (e.g., within a pre-defined duration), the processor(s) would likely count each such detected GNSS state change on a per device basis but could alternatively count just one GNSS state change if that is the desired implementation of the disclosed approach. Other implementations are also possible.

In this way, the processor(s) could help maintain and update a plurality of counters over time for a plurality of sub-areas, so as to enable assessment of how many GNSS state changes occurred respectively in those sub-areas, perhaps over a certain time period (e.g., in the event that the counter are configured to expire after a certain time period).

As shown in block 308, method 300 may involve making a determination, by the one or more processors, that (i) the respective counter associated with the particular sub-area is representing a particular count that is greater than (ii) other count(s) represented by respective counter(s) associated with one or more other sub-areas of the plurality of sub-areas.

As noted, the disclosed approach may involve determining which sub-area(s) have an exceptionally high extent of GNSS state changes. This relies on the assumption that such a high extent of GNSS state changes in a given sub-area is more likely due user(s)' mobile device(s) entering and/or exiting a GNSS-denied area, and much less likely due to e.g., user(s) starting and/or stopping use of GNSS service on their respective mobile device(s). And because a high extent of GNSS state changes is likely due to user(s)' mobile device(s) entering and/or exiting a GNSS-denied area, an evaluation of GNSS state changes per sub-area can be relied upon for accurate and automated detection of where entrance(s) to a GNSS-denied area may be located.

In this regard, in order to determine whether a particular sub-area has an exceptionally high extent of GNSS state changes, the processor(s) could compare the counter value associated with the particular sub-area to other counter value(s) associated other sub-areas in the vicinity of the particular sub-area. Generally, the processor(s) could identify or otherwise select the other sub-area(s) for 'assessment' according to various factor(s). One example of such factor could be the distance between the sub-areas. Namely, the processor(s) could identify the other sub-area(s) based on the other sub-area(s) being with a (e.g., pre-defined (e.g., 12-meter)) threshold distance away from the particular sub-area being considered (e.g., from the center point or closest edge of the particular sub-area). In another example, the processor(s) could identify sub-area(s) that are neighboring or otherwise substantially adjacent to the particular sub-area, such as a sub-area having at least one edge (could also referred to as 'border') that is at least partially shared with or overlaps at least one edge of the particular sub-area. Other examples are also possible.

In an example implementation, the processor(s) could perform the comparison between the counter values in various ways.

Specifically, when evaluating whether a particular sub-area has an exceptionally high extent of GNSS state changes compared to other sub-area(s) that have been selected or otherwise identified for assessment, the processor(s) could determine whether the particular counter value associated with the particular sub-area is respectively greater than the other counter value(s) by at least a threshold extent. For example, the processor(s) could determine whether the particular counter value is greater than a given other counter value by at least a particular numerical value (e.g., greater by a value of at least 50 or more) or by at least a particular percentage (e.g., at least 50% higher or more), among other possibilities. If yes, then processor(s) could deem that the particular sub-area has an exceptionally high extent of GNSS state changes.

Additionally or alternatively, the processor(s) could determine whether the particular sub-area has greater extent of GNSS state changes compared to most or at least a portion of the other sub-areas in the vicinity. For example, the processor(s) could determine whether the particular counter value associated with the particular sub-area is greater than at least a threshold portion (e.g., 80%) of other count(s) associated with other sub-area(s) that have been selected or otherwise identified for assessment. If yes, then processor(s) could deem that the particular sub-area has an exceptionally high extent of GNSS state changes.

In some cases, the processor(s) could be configured to assess both the extent to which a counter value of a particular sub-area is greater and whether the particular sub-area's associated counter value is greater than most or many in the vicinity. By way of example, the processor(s) could determine whether the particular sub-area has one of the highest counter value within a range (e.g., 12 meters) and whether this counter value is significantly higher than those of other sub-areas' respective values (e.g., at least 50% higher than 80% of the other sub-areas' counter values). If yes, then processor(s) could deem that the particular sub-area has an exceptionally high extent of GNSS state changes. Other examples and implementations are also possible.

As shown in block 310, method 300 may involve, based at least on the determination, deeming, by the one or more processors, the particular sub-area to include an entrance, thereby resulting in detection of the entrance.

Once the processor(s) make a determination that a particular sub-area has an exceptionally high extent of GNSS state changes, the processor(s) could deem that particular sub-area to include an entrance (or corresponding exit). In doing so, the processor(s) could generate, store, and/or provide an indication that the particular sub-area includes the entrance or otherwise that the entrance has been detected. And since the entrance may be fully (or at least partially) located within the particular sub-area, the processor(s) could generate, store, and/or provide location information for the entrance based on location(s) associated with the particular sub-area.

By way of example, the processor(s) could provide the indication as a notification to a device or service, so that e.g., detection of the entrance can be evaluated by an individual or other entity to ensure detection accuracy and/or to adjust the location of the detected entrance for greater accuracy, among other possibilities. Of course, such a process could also be automated such that the processor(s) use additional data (e.g., satellite or street level image(s)) to confirm presence of the entrance in the particular sub-area and/or adjust location of the entrance to a more precise location within the particular sub-area e.g., based on additional data or the like.

In another example, the processor(s) could map the detected entrance in a map database, such as by generating or updating a map layer to represent the entrance. In particular, the processor(s) could generate a map-based representation of the detected entrance as a map feature and programmatically assign a geographical location to that map feature. In this way, individual(s) and/or other entities using the map at issue can learn about presence of the entrance at that location e.g., for navigation and/or other purposes. Other examples are also possible.

Figure 4A:
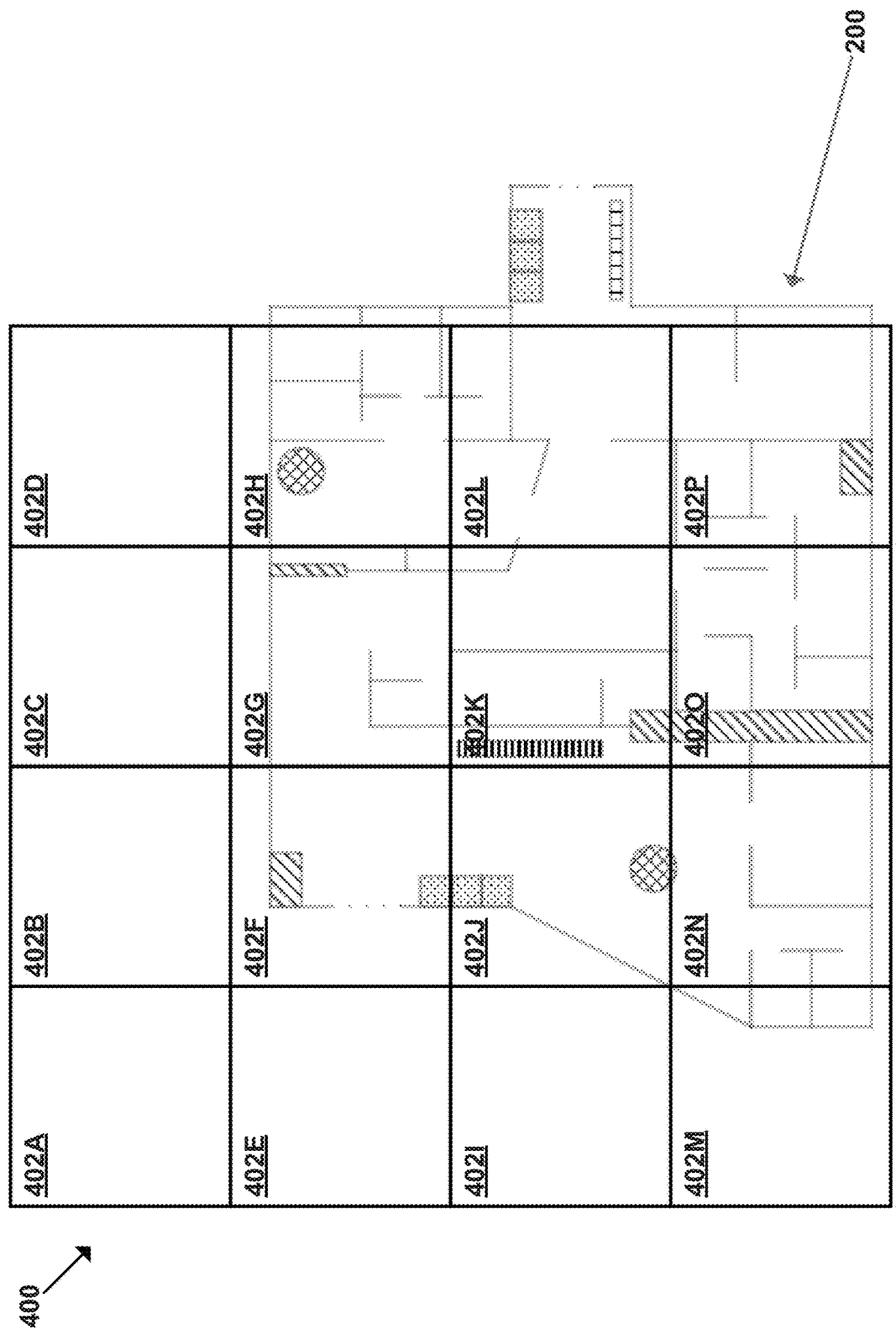
FIGS. 4A and 4B illustrate a plurality of sub-areas and corresponding counters for entrance detection, in accordance with an example implementation.
Figure 4B:
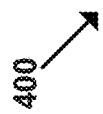

FIGS. 4A and 4B next illustrate an example entrance detection in accordance with the present disclosure. In particular, FIG. 4A illustrates a grid 400 representing a plurality of sub-areas 402A to 402P in and around the general location associated with indoor area 200 of FIG. 2A. And FIG. 4B then illustrates that sub-area 402F has an associated counter value (e.g., "576") that is significantly higher compared to all other counter values associated with the other sub-areas shown in FIGS. 4A and 4B. Accordingly, processor(s) could determine that sub-area 402F has an exceptionally high extent of GNSS state changes and thus includes an entrance, which is correct as an entrance to indoor area 200 is indeed located in the sub-area 402F as shown in FIGS. 2A and 4A. Numerous other illustrations and example scenarios are possible as well.

In a further aspect, the disclosed approach could additionally or alternatively be performed or arranged according to other embodiment(s) and/or to include other feature(s).

In one aspect, the disclosed approach could also help determine where entrance(s) are not located. In particular, there may be a relatively high likelihood that there are no additional entrances to a GNSS-denied area that are in the vicinity (e.g., within a threshold distance) of a detected entrance. Given this, processor(s) could use the above-described determination as basis for deeming that one or more of the other sub-areas selected for assessment as described do not include entrances, respectively. For example, referring back to FIGS. 4A & 4B, the processor(s) could determine that only sub-area 402F includes an entrance and that the remaining of the sub-areas 402A to 402P do not include an entrance. In this aspect, the processor(s) could e.g., generate, store, and/or provide an indication that a given sub-area does not include an entrance.

In another aspect, the disclosed approach could take into account that an entrance could be on or near an edge of a sub-area. By way of example (and without limitation), for each sub-area i within a long range (e.g. 12 meters) from a considered sub-area, the processor(s) could compute the sum of the GNSS state change counters of sub-areas within a short range (e.g. 4 meters) from the subarea i. If the counter sum of the considered sub-area has the highest counter sum within the long range, and the sum is significantly higher than most of the other sub-areas' counter sums (e.g. at least 50% higher than the 80% quantile of the sub-areas' counter sums), the processor(s) could detect that the considered sub-area may include an entrance.

In yet another aspect, the disclosed approach could leverage signal strength and/or direction information to improve reliability of an entrance detection. Specifically, a GNSS receiver can enable determination of signal strength(s) and/or the satellite locations (and thus directions of the satellites). Given this, processor(s) could label GNSS state change(s) to be more reliable indication(s) of an entrance (rather than e.g., a user starting/stopping use of positioning) if the strength of GNSS satellite signal(s) change(s) significantly just (e.g., within a predefined threshold time period) after and/or before a GNSS state change. Additionally or alternatively, the indication can be even more reliable if only the signals of satellites in certain direction(s) or sector(s) change just after and/or before a GNSS state change, as this may suggest that there is a large obstacle that blocks the signals. For example, when a user approaches a building, signals coming from the building's direction tend to get weak(er) before the GNSS fix is entirely lost, and the GNSS position may still be available based on weak(er) signals for a short time after entering the building.

In yet another aspect, the disclosed approach could enable detection of a main entrance to e.g., a building. In particular, assuming that the building has multiple entrances, the counter data may have an associated count respectively for each entrance e.g., based on the sub-area(s) in which the entrances at issue are respectively located. Given this, the processor(s) could determine that a particular count associated with a particular entrance to the building is respectively greater than each of the counts associated with the other entrances to the building. And in response to this determination, the processor(s) could deem the particular entrance as being the main entrance to the building e.g., corresponding to a high extent of GNSS state changes and thus likely more movement of individuals' device into and out of the building via the particular entrance. In doing so, the processor(s) could generate, store, and/or provide an indication (e.g., in a map database) that the particular entrance is the main entrance to the building.

In yet another aspect, the disclosed approach could enable detection of an entrance type, such as e.g., whether a given entrance is an entrance for vehicle(s) or pedestrians and/or the type of vehicle (or other entity) the entrance is for (e.g., train or passenger car), among others. Such entrance(s) could be general building entrances, parking hall entrances, tunnel entrances etc.

For instance, crowdsourced data could include information on the type of entity or setting/context associated with the crowdsourced data (e.g., pedestrian, car, train) and could use that information as basis to determine the entrance type (e.g., indication of a pedestrian would result in a designation of a pedestrian entrance). Such information can be determined (e.g., by a device providing the data) based on movement, speed, and/or acceleration/deceleration pattern(s) of the device immediately preceding and/or at the time of entrance detection. Additionally or alternatively, the crowdsourced data could include information about the movement, speed, and/or acceleration/deceleration pattern(s) and could use this information directly as basis for determining an entrance type. In this regard, processor(s) could optionally maintain separate counters for each entity (e.g., vehicle) type respectively per subarea. And the entity type with the highest counter value is then likely to be deemed the main user of the entrance. So, the processor(s) could generate, store, and/or provide an indication (e.g., in a map database) of an entrance type etc.

In yet another aspect, the disclosed approach could be arranged to ensure that GNSS is lost due to entering a GNSS-denied area rather than due to a user stopping use of a GNSS service or related application. For example, the processor(s) could request GNSS information (e.g., a GNSS-based location) for a short (e.g., pre-defined) duration after GNSS was deemed to be lost and may add a GNSS state change indication (e.g., increment a particular counter) only if the GNSS information is not obtained anymore despite the request. In another example, the processor(s) may add a GNSS state change indication only if strength of GNSS satellite signal(s) change significantly (e.g., by more than a pre-defined threshold extent) just before or after or (e.g., within a pre-defined duration before or after) the detected GNSS state change.

In yet another aspect, the disclosed approach could be arranged to consider only situations when GNSS service is lost or only situations when GNSS service is obtained. In other words, the processor(s) could be configured to consider only GNSS service being lost as a GNSS state change or only GNSS service being obtained as a GNSS state change. Thus, the processor(s) may be configured to increment a given counter only when one of the event types (i.e., GNSS service being lost or obtained) is detected or otherwise occurs at a given device.

In yet another aspect, the disclosed approach could be arranged to detect a 3D location of a detected entrance. In particular, the above-described generation (e.g., division) of sub-areas could be three-dimensional, provided that input data has 3D reference locations. In this regard, the z-dimension coordinate can be e.g. floor index or absolute altitude (e.g. from mean sea level or WGS84 ellipsoid). Other examples and aspects are also possible.

Although certain methods have been described, it should be understood that other processes and/or modification of one or more of the described processes may also be possible in the context of the present disclosure.

III. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
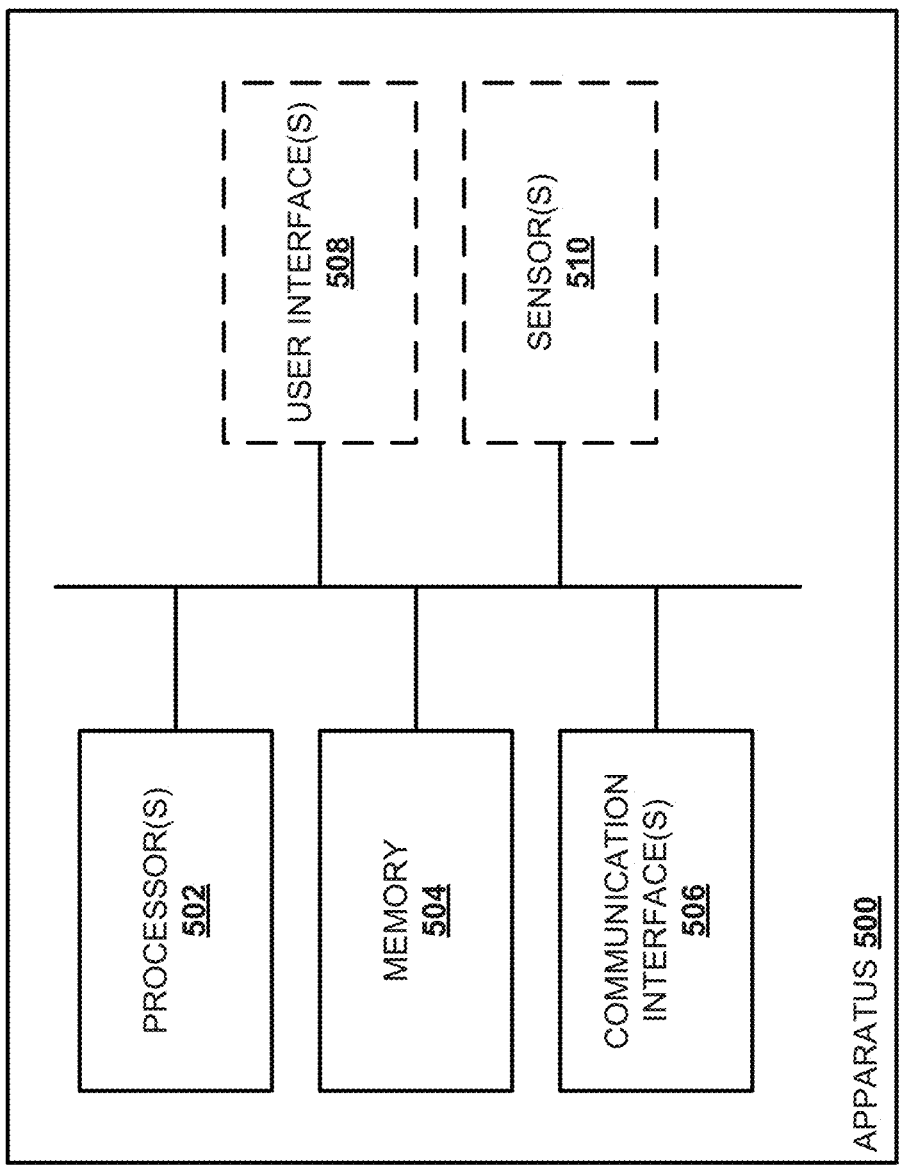
FIG. 5 illustrates an example apparatus, in accordance with an example implementation.

FIG. 5 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure.

In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. Example Geographic Database

Figure 6:
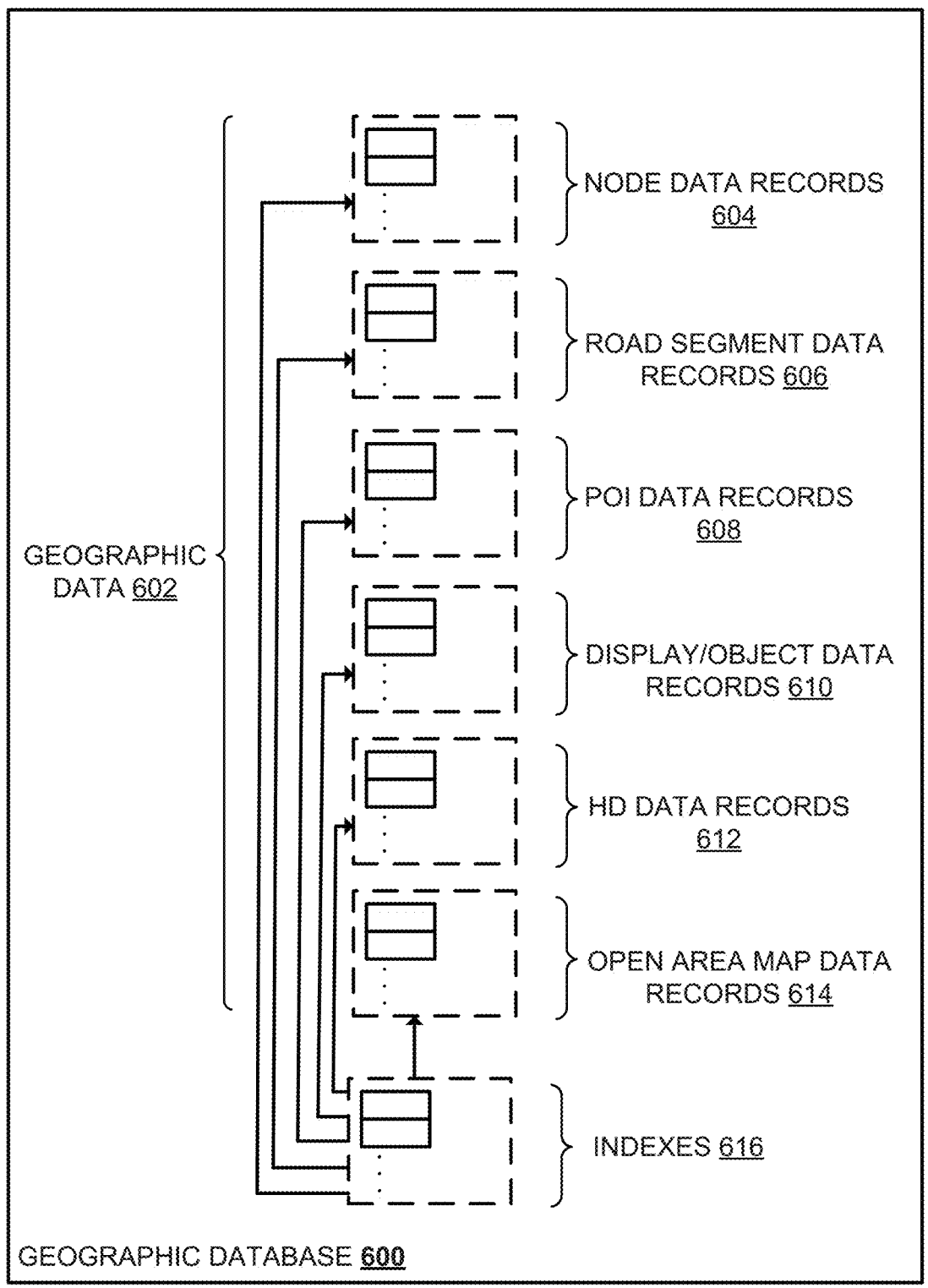
FIG. 6 illustrates a diagram of a geographic database, in accordance with an example implementation.

FIG. 6 illustrates a diagram of a geographic database 600, according to an example implementation. Geographic database 600 could be included within, integrated with, or be separate from another database, data storage device, memory, or the like described herein (e.g., memory 504). Additionally or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed.

For example, in one embodiment, the indexes 616 can be a spatial index of the polygon points associated with stored feature polygons.

In exemplary embodiments, the road segment data records 606 may be links or segments representing roads, streets, or paths, as can be used in a calculated or recorded route information for determination of one or more personalized routes. The node data records 604 may be end points corresponding to the respective links or segments of the road segment data records 606. The road segment data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interfaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   receiving, by one or more processors, Global Navigation Satellite System (GNSS)-related information, wherein the one or more processors have access to counter data arranged to maintain a plurality of counters that each respectively represent a count of how many times GNSS service has been obtained or lost in a respective one of a plurality of sub-areas;
   based on the received GNSS-related information, detecting, by the one or more processors, a GNSS state change corresponding to an instance of GNSS service being obtained or lost in a particular sub-area of the plurality of sub-areas;
   in response to detecting the GNSS state change in the particular sub-area, incrementing, by the one or more processors, the respective counter associated with the particular sub-area;
   making a determination, by the one or more processors, that (i) the respective counter associated with the particular sub-area is representing a particular count that is greater than (ii) one or more other counts represented by one or more respective counters associated with one or more other sub-areas of the plurality of sub-areas; and
   based at least on the determination, deeming, by the one or more processors, the particular sub-area to include an entrance, thereby resulting in detection of the entrance.

2. The method of claim 1, wherein receiving GNSS-related information comprises receiving at least one radio fingerprint including a GNSS-based location reference.

3. The method of claim 1, wherein making the determination corresponds to an assumption that GNSS service is being obtained or lost due to at least one mobile device entering and/or exiting a GNSS-denied area.

4. The method of claim 1, wherein the entrance comprises one or more of a building entrance, tunnel entrance, entrance to a parking garage, or entrance to another GNSS-denied area.

5. The method of claim 1, further comprising:
   identifying, by the one or more processors, the one or more other sub-areas based on one or more of following criteria: (i) one or more of the other sub-areas being within a threshold distance away from the particular sub-area, or (ii) one or more of the other sub-areas being substantially adjacent to the particular sub-area.

6. The method of claim 1, wherein making the determination comprises determining one or more of: (i) that the particular count is respectively greater than one or more of the other counts by at least a threshold extent, or (ii) that the particular count is greater than at least a threshold portion of the other counts associated with the one or more other sub-areas.

7. The method of claim 1, wherein deeming the particular sub-area to include an entrance comprises generating, storing, or providing an indication that the particular sub-area includes the entrance or otherwise that the entrance has been detected.

8. The method of claim 1, wherein deeming the particular sub-area to include an entrance comprises generating, storing, or providing location information for the entrance based on one or more locations associated with the particular sub-area.

9. The method of claim 1, further comprising:
   based at least on the determination, deeming, by the one or more processors, the one or more other sub-areas as not including entrances, respectively.

10. The method of claim 1, wherein GNSS service being obtained or lost corresponds to one or more of: (i) GNSS service being completely obtained or lost, (ii) ability or inability to obtain a GNSS-based position or signal in response to a request for the GNSS-based position or signal, or (iii) signal strength of the GNSS-based signal changing by at least a threshold extent.

11. The method of claim 1, wherein the detected entrance is one of a plurality of entrances to a building each respectively having an associated count of GNSS state changes in accordance with the counter data, the method further comprising:
   making a further determination, by the one or more processors, that the particular count associated with the detected entrance is respectively greater than each of the counts associated with one or more other entrances from among the plurality of entrances to the building; and
   based on the further determination, deeming, by the one or more processors, the detected entrance to be a main entrance to the building.

12. An apparatus comprising:
   one or more processors;
   a non-transitory computer readable medium; and
   program instructions stored on the non-transitory computer readable medium and executable by the one or more processors to:
      receive Global Navigation Satellite System (GNSS)-related information, wherein the one or more processors have access to counter data arranged to maintain a plurality of counters that each respectively represent a count of how many times GNSS service has been obtained or lost in a respective one of a plurality of sub-areas;
      based on the received GNSS-related information, detect a GNSS state change corresponding to an instance of GNSS service being obtained or lost in a particular sub-area of the plurality of sub-areas;
      in response to detecting the GNSS state change in the particular sub-area, increment the respective counter associated with the particular sub-area;
      make a determination that (i) the respective counter associated with the particular sub-area is representing a particular count that is greater than (ii) one or more other counts represented by one or more respective counters associated with one or more other sub-areas of the plurality of sub-areas; and
      based at least on the determination, deem the particular sub-area to include an entrance, thereby resulting in detection of the entrance.

13. The apparatus of claim 12, wherein the program instructions are further executable to: identify the one or more other sub-areas based on one or more of following criteria: (i) one or more of the other sub-areas being within a threshold distance away from the particular sub-area, or (ii) one or more of the other sub-areas being substantially adjacent to the particular sub-area.

14. The apparatus of claim 12, wherein making the determination comprises determining one or more of: (i) that the particular count is respectively greater than one or more of the other counts by at least a threshold extent, or (ii) that the particular count is greater than at least a threshold portion of the other counts associated with the one or more other sub-areas.

15. The apparatus of claim 12, wherein deeming the particular sub-area to include an entrance comprises generating, storing, or providing an indication that the particular sub-area includes the entrance or otherwise that the entrance has been detected.

16. The apparatus of claim 12, wherein deeming the particular sub-area to include an entrance comprises generating, storing, or providing location information for the entrance based on one or more locations associated with the particular sub-area.

17. The apparatus of claim 12, wherein the program instructions are further executable to: based at least on the determination, deem the one or more other sub-area as not including entrances, respectively.

18. The apparatus of claim 12, wherein GNSS service being obtained or lost corresponds to one or more of: (i) GNSS service being completely obtained or lost, (ii) ability or inability to obtain a GNSS-based position or signal in response to a request for the GNSS-based position or signal, or (iii) signal strength of the GNSS-based signal changing by at least a threshold extent.

19. The apparatus of claim 12, wherein the detected entrance is one of a plurality of entrances to a building each respectively having an associated count of GNSS state changes in accordance with the counter data, and wherein the program instructions are further executable to:

make a further determination that the particular count associated with the detected entrance is respectively greater than each of the counts associated with one or more other entrances from among the plurality of entrances to the building; and based on the further determination, deem the detected entrance to be a main entrance to the building.

20. A non-transitory computer readable medium having stored thereon instructions executable by one or more processors to cause an apparatus to perform operations comprising:

receiving Global Navigation Satellite System (GNSS)-related information, wherein the one or more processors have access to counter data arranged to maintain a plurality of counters that each respectively represent a count of how many times GNSS service has been obtained or lost in a respective one of a plurality of sub-areas;

based on the received GNSS-related information, detecting a GNSS state change corresponding to an instance of GNSS service being obtained or lost in a particular sub-area of the plurality of sub-areas;

in response to detecting the GNSS state change in the particular sub-area, incrementing the respective counter associated with the particular sub-area;

making a determination that (i) the respective counter associated with the particular sub-area is representing a particular count that is greater than (ii) one or more other counts represented by one or more respective counters associated with one or more other sub-areas of the plurality of sub-areas; and based at least on the determination, deeming the particular sub-area to include an entrance, thereby resulting in detection of the entrance.

* * * * *